US009925984B2

(12) United States Patent
Kato et al.

(10) Patent No.: US 9,925,984 B2
(45) Date of Patent: Mar. 27, 2018

(54) VEHICLE APPROACH DETECTION DEVICE AND VEHICLE APPROACH DETECTION METHOD

(71) Applicant: Mitsubishi Electric Corporation, Tokyo (JP)

(72) Inventors: Yoichi Kato, Tokyo (JP); Takahisa Aoyagi, Tokyo (JP)

(73) Assignee: Mitsubishi Electric Corporation, Tokyo (JP)

( * ) Notice: Subject to any disclaimer, the term of this patent is extended or adjusted under 35 U.S.C. 154(b) by 0 days.

(21) Appl. No.: 15/227,078

(22) Filed: Aug. 3, 2016

(65) Prior Publication Data
US 2017/0217440 A1    Aug. 3, 2017

(30) Foreign Application Priority Data

Feb. 3, 2016 (JP) ................................. 2016-018770

(51) Int. Cl.
| B60W 30/18 | (2012.01) |
| B60W 10/18 | (2012.01) |
| B60W 10/30 | (2006.01) |
| B60W 30/09 | (2012.01) |
| G08G 1/04 | (2006.01) |

(Continued)

(52) U.S. Cl.
CPC ...... *B60W 30/18154* (2013.01); *B60W 10/18* (2013.01); *B60W 10/30* (2013.01); *B60W 30/09* (2013.01); *B60W 30/0956* (2013.01); *B60W 50/14* (2013.01); *G06K 9/00825* (2013.01); *G08G 1/04* (2013.01); *G08G 1/166* (2013.01); *B60W 2050/143* (2013.01);

(Continued)

(58) Field of Classification Search
CPC ..... B60W 30/18154; G06F 17/10; G08G 1/16
See application file for complete search history.

(56) References Cited

U.S. PATENT DOCUMENTS 6,366,232 B1 * 4/2002 Liedtke ............... G01S 13/0209
                                                        342/196
9,646,428 B1 * 5/2017 Konrardy ................. G07C 5/08
(Continued)

FOREIGN PATENT DOCUMENTS

JP          03-119300 U1    12/1991
JP          2004-102889 A    4/2004
(Continued)

OTHER PUBLICATIONS

Communication dated Jan. 10, 2017, from the Japanese Patent Office in counterpart Japanese application No. 2016-018770.

*Primary Examiner* — Alex C Dunn
(74) *Attorney, Agent, or Firm* — Sughrue Mion, PLLC; Richard C. Turner

(57) ABSTRACT

Provided are a vehicle approach detection device and a vehicle approach detection method that are capable of detecting an approach of another vehicle without installing a dedicated device on a road. At least one of a vehicle surrounding video for showing an observed area (for example, road surface) used to observe irradiation light (for example, headlight beam emitted from a headlight of another vehicle) from another vehicle and a vehicle surrounding environmental sound is detected as vehicle external information, and it is determined based on the detected vehicle external information whether or not another vehicle is approaching an own vehicle.

10 Claims, 15 Drawing Sheets

(51) Int. Cl.
*G08G 1/16* (2006.01)
*B60W 50/14* (2012.01)
*B60W 30/095* (2012.01)
*G06K 9/00* (2006.01)

(52) U.S. Cl.
CPC ..... *B60W 2420/42* (2013.01); *B60W 2420/54* (2013.01); *B60W 2510/18* (2013.01); *B60W 2510/20* (2013.01)

(56) References Cited

U.S. PATENT DOCUMENTS

| | | | | |
|---|---|---|---|---|
| 2005/0152581 | A1* | 7/2005 | Hoki | B60Q 1/085 382/104 |
| 2007/0279250 | A1* | 12/2007 | Kume | G08G 1/162 340/903 |
| 2008/0215241 | A1* | 9/2008 | Hanagasaki | G01S 17/89 701/300 |
| 2009/0324016 | A1* | 12/2009 | Ikeda | G01S 3/7864 382/103 |
| 2010/0219947 | A1* | 9/2010 | Kataoka | B60K 35/00 340/461 |
| 2012/0288156 | A1* | 11/2012 | Kido | H04N 9/73 382/104 |
| 2015/0061895 | A1* | 3/2015 | Ricci | H04W 4/22 340/902 |
| 2015/0127191 | A1* | 5/2015 | Misra | G08G 1/0112 701/1 |
| 2016/0217689 | A1* | 7/2016 | Young | G08G 1/0965 |
| 2017/0213459 | A1* | 7/2017 | Ogaz | G08G 1/096725 |

FOREIGN PATENT DOCUMENTS

| | | |
|---|---|---|
| JP | 2013-061777 A | 4/2013 |
| WO | 2013175637 A1 | 11/2013 |

* cited by examiner

VEHICLE APPROACH DETECTION DEVICE AND VEHICLE APPROACH DETECTION METHOD

BACKGROUND OF THE INVENTION

1. Field of the Invention

The present invention relates to a vehicle approach detection device and a vehicle approach detection method for determining whether or not a vehicle is being approached by another vehicle, to thereby detect an approach of another vehicle.

2. Description of the Related Art

In recent years, a vehicle having a warning function using an on-vehicle camera or a radar and a preventive safety function, for example, an automatic braking function, is becoming widespread. In particular, there has been developed a technology for detecting brake light of a preceding vehicle or a headlight of an oncoming vehicle by a camera when traveling at night or when traveling in a dark surrounding environment, to thereby issue a rear-end collision alarm or control a headlight of an own vehicle.

Specifically, for example, there is proposed a technology for warning a driver by detecting a light of another vehicle entering a curved section of a road from behind the curve for the purpose of avoiding an accident at night (see, for example, Japanese Utility Model Application Laid-open No. 03-119300).

However, with the related art disclosed in Japanese Utility Model Application Laid-open No. 03-119300, in order to detect the light of another vehicle, a dedicated device needs to be installed at every necessary spot on the road, which, as a result, requires much cost. Therefore, it is necessary to provide a technology capable of detecting an approach of another vehicle without installing such a dedicated device on a road.

SUMMARY OF THE INVENTION

The present invention has been made in order to solve the above-mentioned problem, and has an object to obtain a vehicle approach detection device and a vehicle approach detection method that are capable of detecting an approach of another vehicle without installing a dedicated device on a road.

According to one embodiment of the present invention, there is provided a vehicle approach detection device, which is mounted on a vehicle, including: a vehicle external information detector configured to detect at least one of a vehicle surrounding video for showing an observed area used to observe irradiation light from another vehicle or a vehicle surrounding environmental sound as vehicle external information, to thereby output the detected vehicle external information; and an electronic control unit including a vehicle approach detection unit configured to determine whether or not the another vehicle is approaching the vehicle based on the vehicle external information input from the vehicle external information detector.

Further, according to one embodiment of the present invention, there is provided a vehicle approach detection method to be executed by an electronic control unit mounted on a vehicle, including: acquiring vehicle external information from a vehicle external information detector configured to detect at least one of a vehicle surrounding video for showing an observed area used to observe irradiation light from another vehicle or a vehicle surrounding environmental sound as vehicle external information, to thereby output the detected vehicle external information; and determining whether or not the another vehicle is approaching the vehicle based on the acquired vehicle external information.

According to the present invention, at least one of the vehicle surrounding video for showing an observed area used to observe irradiation light from another vehicle and the vehicle surrounding environmental sound is detected as the vehicle external information, and it is determined based on a detection result thereof whether or not another vehicle is approaching the vehicle. With this configuration, it is possible to obtain the vehicle approach detection device and the vehicle approach detection method that are capable of detecting an approach of another vehicle without installing a dedicated device on a road.

DETAILED DESCRIPTION OF THE PREFERRED EMBODIMENTS

Now, a vehicle approach detection device and a vehicle approach detection method according to exemplary embodiments of the present invention are described referring to the accompanying drawings. In the illustration of the drawings, the same components or corresponding components are denoted by the same reference symbols, and the overlapping description thereof is herein omitted.

First Embodiment

Figure 1:
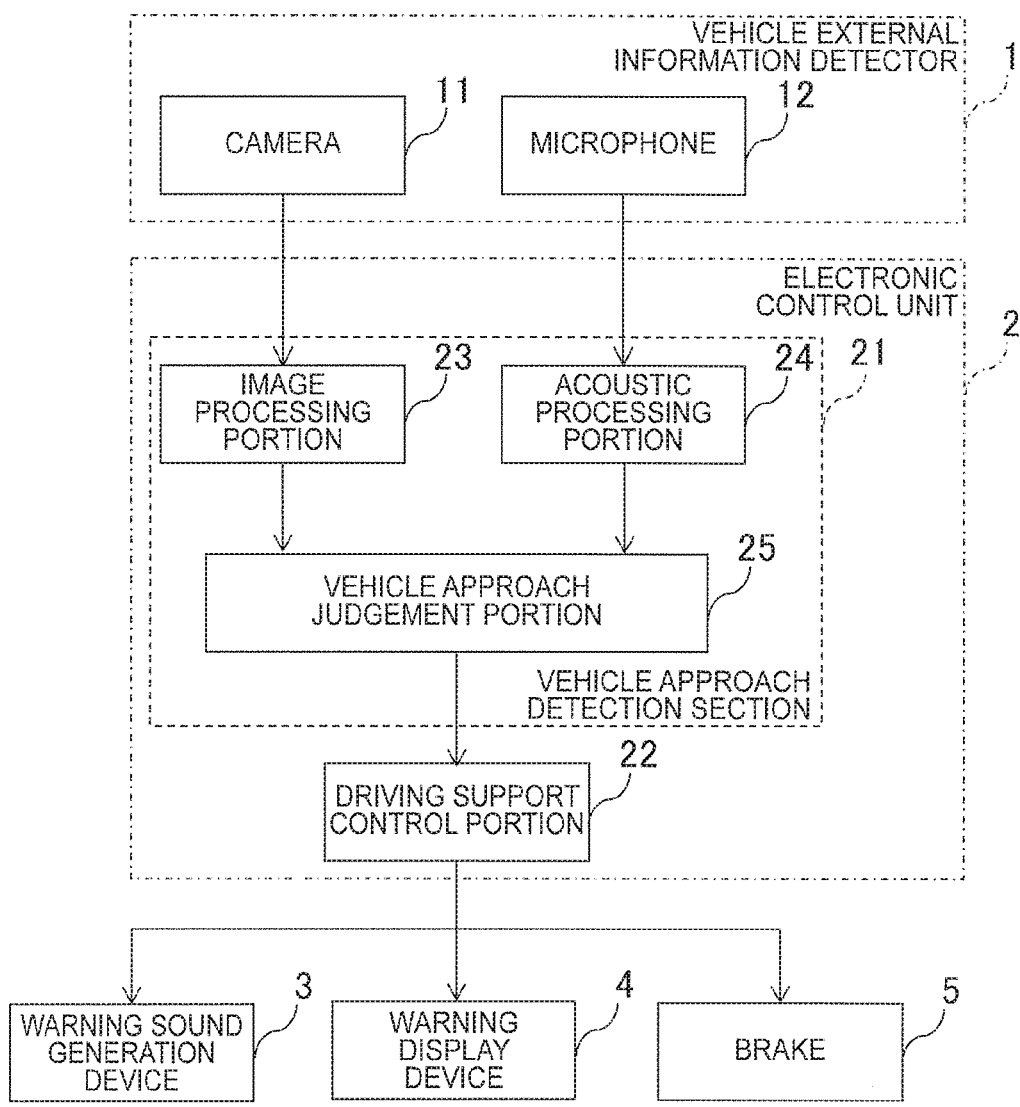
FIG. 1 is a block diagram for illustrating a configuration of a vehicle approach detection device according to a first embodiment of the present invention.

FIG. 1 is a block diagram for illustrating a configuration of a vehicle approach detection device according to a first embodiment of the present invention. The vehicle approach detection device illustrated in FIG. 1 includes a vehicle external information detector 1, an electronic control unit 2, a warning sound generation device 3, a warning display device 4, and a brake 5.

The vehicle external information detector 1 includes a camera 11 and a microphone 12, and the camera 11 and the microphone 12 are mounted on a vehicle.

The camera 11 is configured to acquire a video of surroundings including an area ahead of the vehicle including the camera 11, and output the video. Further, the camera 11 is set in advance to acquire a vehicle surrounding video for showing a road surface as an observed area used to observe irradiation light from another vehicle. The first embodiment is described by taking an exemplary case where the irradiation light from another vehicle is a headlight beam emitted from a headlight of another vehicle. The microphone 12 is configured to acquire an environmental sound around the vehicle (hereinafter referred to as "vehicle surrounding environmental sound"), and output the vehicle surrounding environmental sound.

As described above, the vehicle external information detector 1 is configured to detect the vehicle surrounding video for showing the observed area used to observe the irradiation light from another vehicle and the vehicle surrounding environmental sound as vehicle external information, and output the detected vehicle external information.

The electronic control unit 2 is formed by, for example, a CPU configured to execute a program stored in a memory and a system LSI or other such processing circuit. The electronic control unit 2 includes a vehicle approach detection section 21 and a driving support control portion 22.

The vehicle approach detection section 21 includes an image processing portion 23, an acoustic processing portion 24, and a vehicle approach judgement portion 25.

The image processing portion 23 is configured to acquire the vehicle surrounding video acquired by the camera 11 at a fixed cycle, and apply a known image analysis to the acquired vehicle surrounding video, to thereby detect a time-series change in a luminance of the road surface shown in the vehicle surrounding video. Specifically, the image processing portion 23 is configured to detect a time-series change in each pixel value of the vehicle surrounding video input from the camera 11. Further, the image processing portion 23 is configured to output a detection result thereof to the vehicle approach judgement portion 25.

The acoustic processing portion 24 is configured to acquire the vehicle surrounding environmental sound acquired by the microphone 12, and apply a known acoustic analysis to the acquired vehicle surrounding environmental sound, to thereby detect a change in an engine sound of another vehicle. Specifically, the acoustic processing portion 24 is configured to detect a time-series change in the engine sound of another vehicle included in the vehicle surrounding environmental sound input from the microphone 12. Further, the acoustic processing portion 24 is configured to output a detection result thereof to the vehicle approach judgement portion 25.

The vehicle approach judgement portion 25 is configured to determine whether or not another vehicle is approaching the vehicle based on the detection result from the image processing portion 23 and the detection result from the acoustic processing portion 24, and output a determination result thereof to the driving support control portion 22.

As described above, the vehicle approach detection section 21 is configured to determine whether or not another vehicle is approaching the vehicle based on the vehicle external information input from the vehicle external information detector 1.

The driving support control portion 22 is configured to provide the vehicle with driving support corresponding to the approach of another vehicle when it is determined that another vehicle is approaching the vehicle as a result of the determination conducted by the vehicle approach judgement portion 25.

Specifically, as a first example of the driving support, the driving support control portion 22 controls the warning sound generation device 3 to output a warning sound, to thereby warn a driver of the vehicle that another vehicle is approaching the vehicle. As a second example of the driving support, the driving support control portion 22 controls the warning display device 4 to display a video indicating a warning, to thereby warn the driver of the vehicle that another vehicle is approaching the vehicle. With such a configuration, the driver is warned of the approach of another vehicle, and hence further safety of the driver is ensured.

As a third example of the driving support, the driving support control portion 22 controls the brake 5 as necessary, to thereby decelerate the speed of the vehicle. With this configuration, automatic brake control is conducted, and hence further safety of the driver is ensured. As another example of the driving support, the direction of the light beam may be controlled so as not to block the view of a driver of another vehicle.

In this manner, various kinds of driving support are conceivable as the driving support for the vehicle corresponding to the approach of another vehicle. The driving support control portion 22 may be configured so that at least one of a plurality of kinds of driving support exemplified above is provided.

Next, a series of steps of a vehicle approach judgement operation of the vehicle approach detection device according to the first embodiment is described with reference to FIG.

Figure 2:
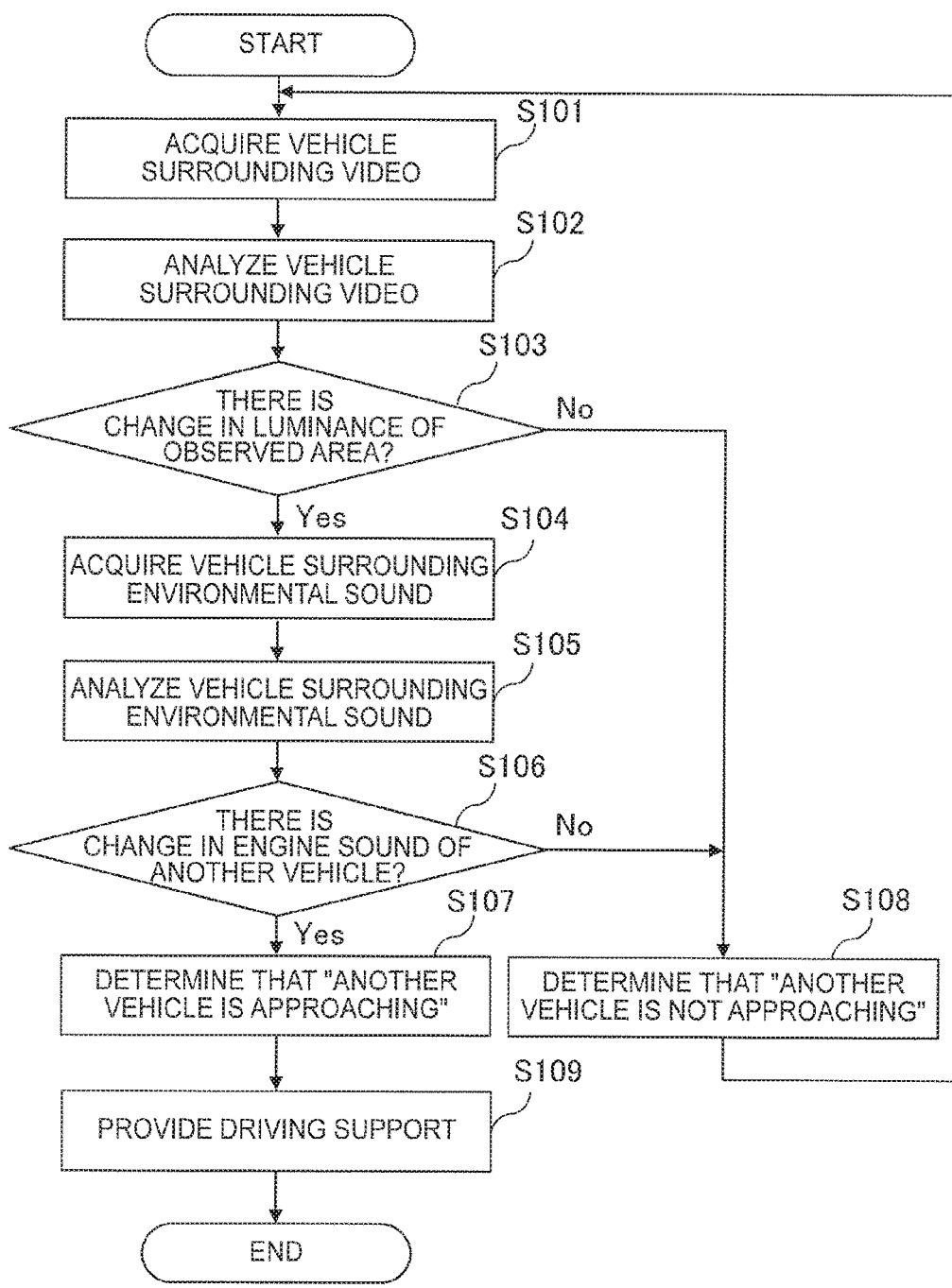
FIG. 2 is a flowchart for illustrating a series of steps of a vehicle approach judgement operation of the vehicle approach detection device according to the first embodiment of the present invention.

2. FIG. 2 is a flowchart for illustrating the series of steps of the vehicle approach judgement operation of the vehicle approach detection device according to the first embodiment of the present invention.

In Step S101, the image processing portion 23 acquires the vehicle surrounding video from the camera 11, and the processing advances to Step S102. Note that, a time interval at which the image processing portion 23 acquires the vehicle surrounding video from the camera 11 is desirably an interval taking into consideration being able to provide the driver with the driving support at an early stage and being able to conduct an image analysis in more detail, for example, several tens to several hundreds of milliseconds. Further, the following description is made by taking an exemplary case where a video including the road surface ahead of the vehicle is acquired as the vehicle surrounding video on the assumption that the vehicle is moving forward.

In Step S102, the image processing portion 23 conducts the image analysis for the vehicle surrounding video acquired in Step S101, and the processing advances to Step S103.

In Step S103, the vehicle approach judgement portion 25 uses an image analysis result obtained in Step S102 to determine whether or not there is a change in a luminance of the observed area, that is, the luminance of the road surface. In Step S103, when it is determined that there is a change in the luminance of the road surface, the processing advances to Step S104, and when it is determined that there is no change in the luminance of the road surface, the processing advances to Step S108.

Specifically, the image processing portion 23 detects the time-series change in each pixel value of the vehicle surrounding video input from the camera 11, that is, a change in each pixel value of a time series within the vehicle surrounding video. The image processing portion 23 analyzes, for example, a time-series change in a lightness or a brightness of each pixel as the time-series change in each pixel value.

The vehicle approach judgement portion 25 determines that there is a change in the luminance of the road surface when there are increases in a plurality of pixel values as the time-series change in the respective pixel values analyzed by the image processing portion 23, and otherwise determines that there is no change in the luminance of the road surface.

Figure 3:
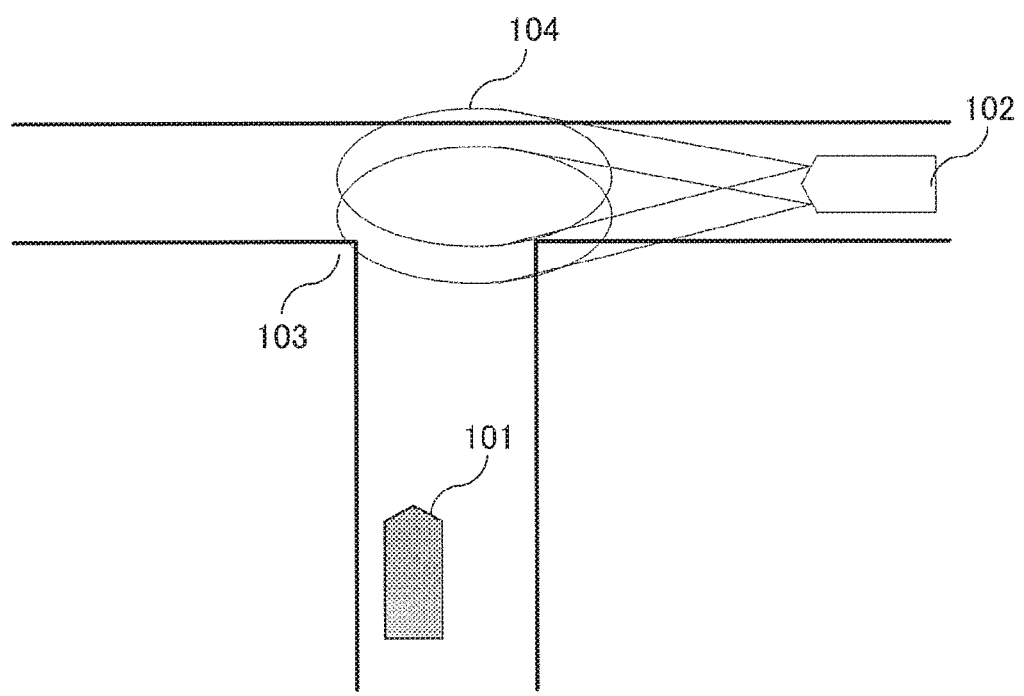
FIG. 3 is an explanatory diagram for illustrating an example of a scene exhibiting a change in a luminance of a road surface which is determined by a vehicle approach judgement portion of FIG. 1.

Now, an exemplary case where it is determined that there is a change in the luminance of the road surface is described with reference to FIG. 3. FIG. 3 is an explanatory diagram for illustrating an example of a scene exhibiting a change in the luminance of the road surface which is determined by the vehicle approach judgement portion 25 of FIG. 1.

In FIG. 3, an own vehicle 101 traveling on the road surface is entering an intersection 103 with poor visibility, and another vehicle 102 is traveling leftward while emitting a headlight beam 104. In other words, FIG. 3 is an illustration of a situation in which the another vehicle 102 is approaching the own vehicle 101 from the right direction.

In this case, as the another vehicle 102 moves leftward, the another vehicle 102 approaches the own vehicle 101. As a result, a vehicle surrounding image acquired by the camera 11 becomes brighter due to the headlight beam 104. In other words, a plurality of pixels having pixel values increasing over time exist in the time-series change in each pixel value of the vehicle surrounding video.

In this manner, when another vehicle is approaching the vehicle, there is a change in the luminance of the road surface shown in the vehicle surrounding video. In view of the foregoing, the vehicle approach detection section 21 is configured to determine the presence or absence of a change in the luminance of the road surface based on the vehicle surrounding image acquired by the camera 11, and to determine whether or not another vehicle is approaching the vehicle through use of a determination result thereof. Therefore, it is possible to predict in advance the approach of another vehicle from another direction different from a traveling direction of the vehicle in the situation illustrated in FIG. 3.

Returning to the description made with reference to FIG. 2, in Step S104, the acoustic processing portion 24 acquires the vehicle surrounding environmental sound from the microphone 12, and the processing advances to Step S105. Note that, a time interval at which the acoustic processing portion 24 acquires the vehicle surrounding environmental sound from the microphone 12 is desirably an interval taking into consideration being able to provide the driver with the driving support at an early stage and being able to conduct an acoustic analysis in more detail, for example, several tens to several hundreds of milliseconds.

In Step S105, the acoustic processing portion 24 conducts the acoustic analysis for the vehicle surrounding environmental sound acquired in Step S104, and the processing advances to Step S106.

In Step S106, the vehicle approach judgement portion 25 uses an acoustic analysis result obtained in Step S105 to determine whether or not there is a change in the engine sound of another vehicle. In Step S106, when it is determined that there is a change in the engine sound of another vehicle, the processing advances to Step S107, and when it is determined that there is no change in the engine sound of another vehicle, the processing advances to Step S108.

Specifically, the acoustic processing portion 24 detects the time-series change in the engine sound of another vehicle included in the vehicle surrounding environmental sound input from the microphone 12.

The vehicle approach judgement portion 25 determines that there is a change in the engine sound of another vehicle when there is an increase in the number of engine sound components as the time-series change in the engine sound of another vehicle analyzed by the acoustic processing portion 24, and otherwise determines that there is no change in the engine sound of another vehicle.

In Step S107, the vehicle approach judgement portion 25 determines that another vehicle is approaching the vehicle, and the processing advances to Step S109.

In Step S108, the vehicle approach judgement portion 25 determines that another vehicle is not approaching the vehicle, and the processing returns to Step S101.

In this manner, the vehicle approach detection section 21 determines whether or not another vehicle is approaching the vehicle based on both the time-series change in the luminance of the road surface and the time-series change in the engine sound of another vehicle.

The first embodiment is described by taking an exemplary case of being configured to determine whether or not another vehicle is approaching the vehicle based on both the time-series change in the luminance of the road surface and the time-series change in the engine sound of another vehicle, but the present invention is not limited thereto. That is, it may be determined whether or not another vehicle is approaching the vehicle based on any one of the time-series change in the luminance of the road surface and the time-series change in the engine sound of another vehicle.

In Step S109, the driving support control portion 22 provides the driving support, and the processing is brought to an end.

As described above, according to the first embodiment, at least one of the vehicle surrounding video for showing the observed area used to observe the irradiation light from another vehicle and the vehicle surrounding environmental sound is detected as the vehicle external information, and it is determined based on a detection result thereof whether or not another vehicle is approaching the vehicle. With this configuration, it is possible to detect an approach of another vehicle without installing a dedicated device on a road.

Further, in the above-mentioned configuration, both the vehicle surrounding video and the vehicle surrounding environmental sound are detected as the vehicle external information to determine based on a detection result thereof whether or not another vehicle is approaching the vehicle, to thereby be able to further improve reliability in vehicle approach judgement.

Further, in the above-mentioned configuration, the driving support for the vehicle is further provided when it is determined that another vehicle is approaching the vehicle. With this configuration, it is possible to ensure further safety of the driver. For example, it is possible to warn the driver of the approach of another vehicle when the vehicle is about to enter an intersection or a curve with poor visibility while the driver is driving the vehicle at night.

Note that, the luminance of the road surface may be detected from multiple directions, for example, not only the change in the luminance of the road surface ahead of the vehicle but also the change in the luminance of the road surface on the rear side may be detected when the vehicle moves backward, to thereby determine based on a detection result thereof whether or not another vehicle is approaching the vehicle. Further, the change in the luminance of the road surface and the change in the engine sound of another vehicle may be detected to predict a risk corresponding to a change amount per fixed time period, and a start timing of each of warning sound output control and the automatic brake control may be changed based on the predicted risk. Further, a control amount of each of the warning sound output control and the automatic brake control may be changed based on the predicted risk.

Second Embodiment

In a second embodiment of the present invention, a description is made of a vehicle approach detection device configured to change the observed area based on wall surface information around the vehicle, in addition to the configuration of the first embodiment. Note that, in the second embodiment, the description of the same points as those of the first embodiment is omitted, and points different from those of the first embodiment are mainly described.

Figure 4:
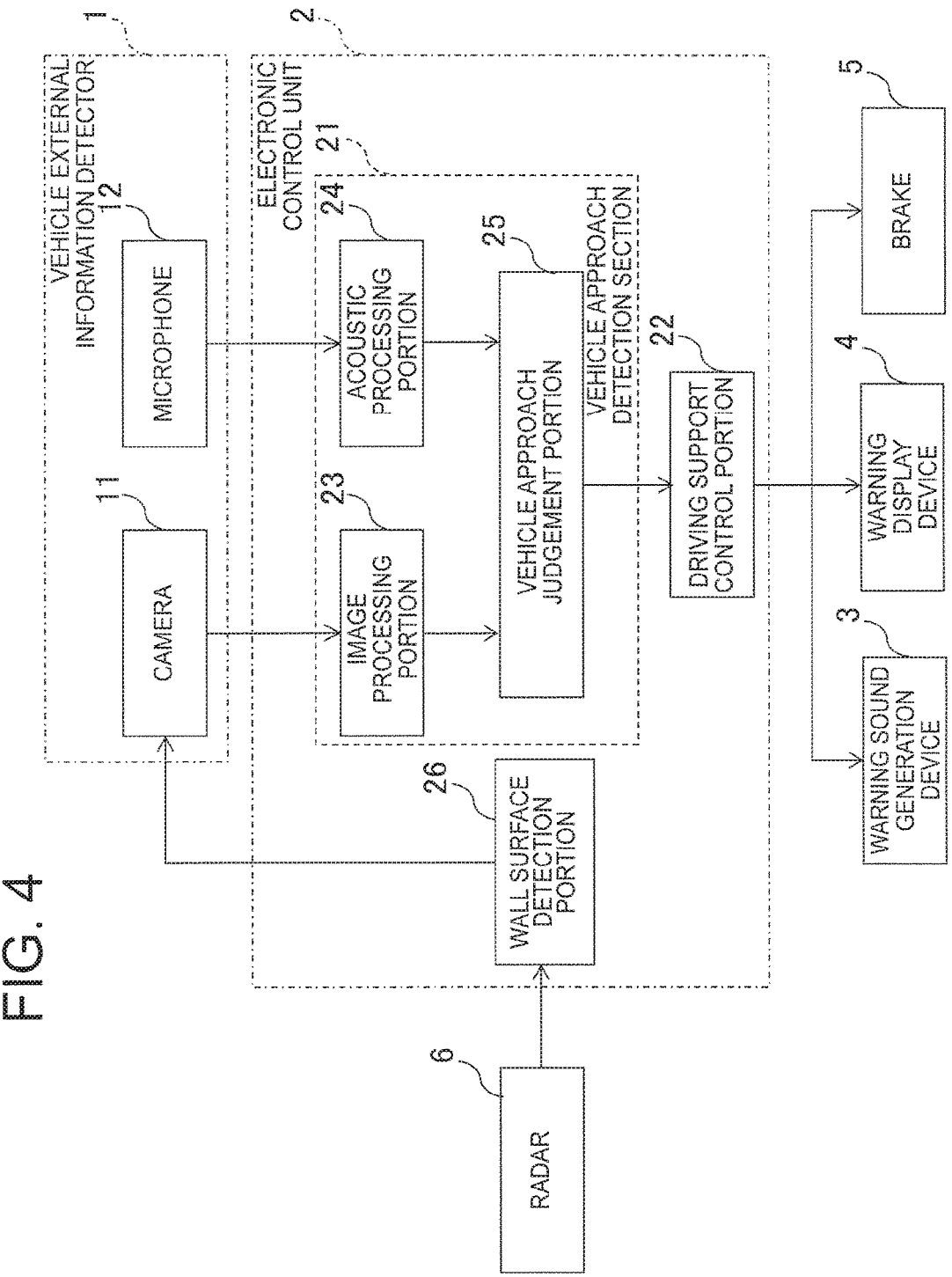
FIG. 4 is a block diagram for illustrating a configuration of a vehicle approach detection device according to a second embodiment of the present invention.

FIG. 4 is a block diagram for illustrating a configuration of the vehicle approach detection device according to the second embodiment of the present invention. In addition to the components of FIG. 1, the vehicle approach detection device of FIG. 4 further includes a radar 6 mounted on the vehicle and a wall surface detection portion 26 included in the electronic control unit 2.

The radar 6 is configured to detect information on an obstruction around the vehicle as radar information, and output the detected radar information to the wall surface detection portion 26. The radar information includes information indicating presence or absence of a wall surface around the vehicle and information indicating a positional relationship of the wall surface.

The wall surface detection portion 26 is configured to estimate how the wall surface exists around the vehicle from the radar information input from the radar 6, and generate the wall surface information obtained by expressing an estimation result in the form of a map. In other words, the wall surface detection portion 26 is configured to generate information on the wall surface around the vehicle as the wall surface information from the radar information. Further, the wall surface detection portion 26 is configured to determine, based on the generated wall surface information, presence or absence of a first target wall surface located so as to be opposed to the traveling direction of the vehicle, and set the observed area to any one of the first target wall surface and the road surface based on a determination result thereof.

Figure 5:
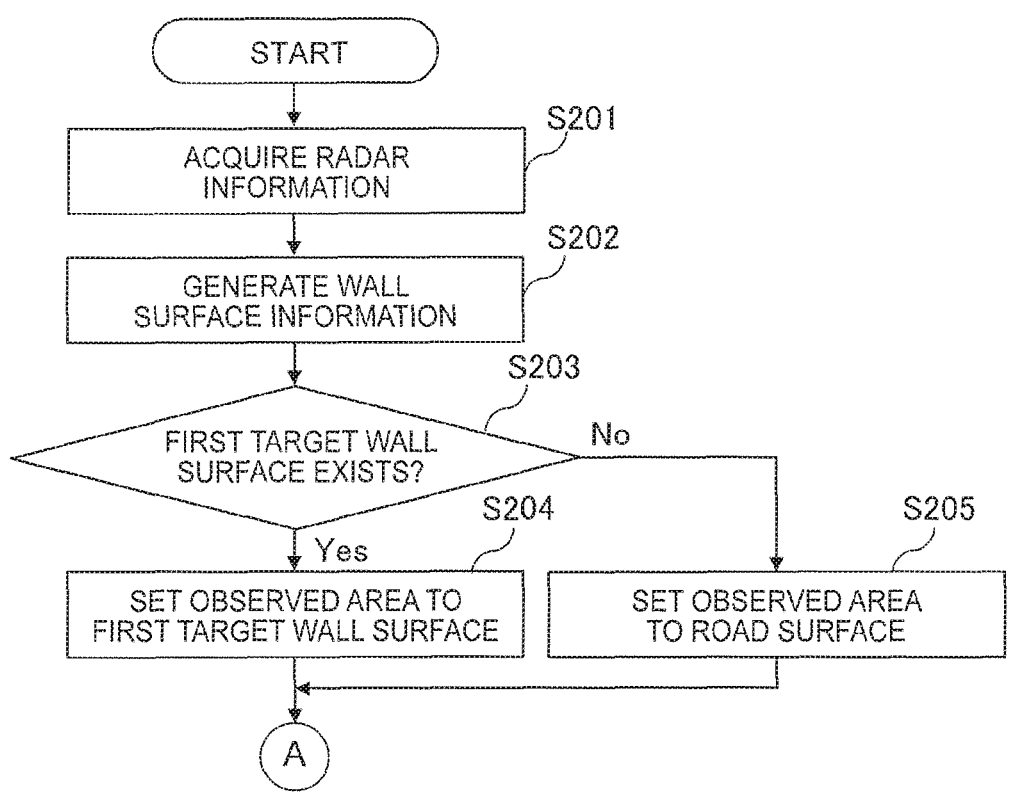
FIG. 5 is a flowchart for illustrating a series of steps of a vehicle approach judgement operation of the vehicle approach detection device according to the second embodiment of the present invention.
Figure 6:
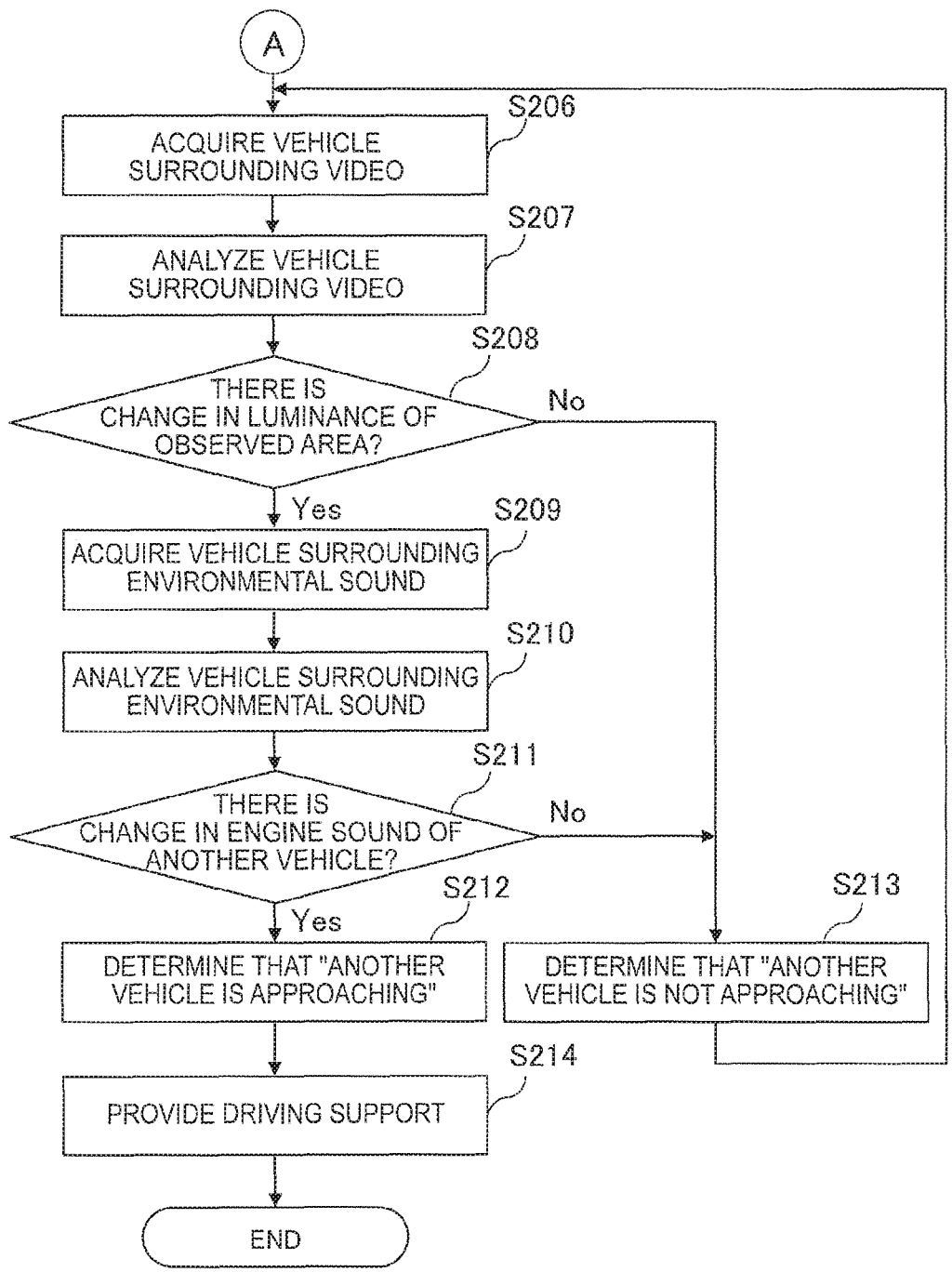
FIG. 6 is a flowchart for illustrating a series of steps of the vehicle approach judgement operation of the vehicle approach detection device according to the second embodiment of the present invention.

Next, a series of steps of a vehicle approach judgement operation of the vehicle approach detection device according to the second embodiment is described with reference to FIG. 5 and FIG. 6. FIG. 5 and FIG. 6 are a flowchart for illustrating the series of steps of the vehicle approach judgement operation of the vehicle approach detection device according to the second embodiment of the present invention. FIG. 5 and FIG. 6 are obtained by dividing one flowchart into two illustrations, and the part illustrated in FIG. 5 is followed by the part illustrated in FIG. 6.

In Step S201, the wall surface detection portion 26 acquires the radar information from the radar 6, and the processing advances to Step S202.

In Step S202, the wall surface detection portion 26 generates the wall surface information from the radar information acquired in Step S201, and the processing advances to Step S203.

In Step S203, the wall surface detection portion 26 determines whether or not the first target wall surface exists based on the wall surface information generated in Step S202. In Step S203, when it is determined that the first target wall surface exists, the processing advances to Step S204, and when it is determined that the first target wall surface does not exist, the processing advances to Step S205.

In Step S204, the wall surface detection portion 26 sets the observed area to the first target wall surface, and the processing advances to Step S206.

In Step S205, the wall surface detection portion 26 sets the observed area to the road surface, and the processing advances to Step S206.

Figure 7:
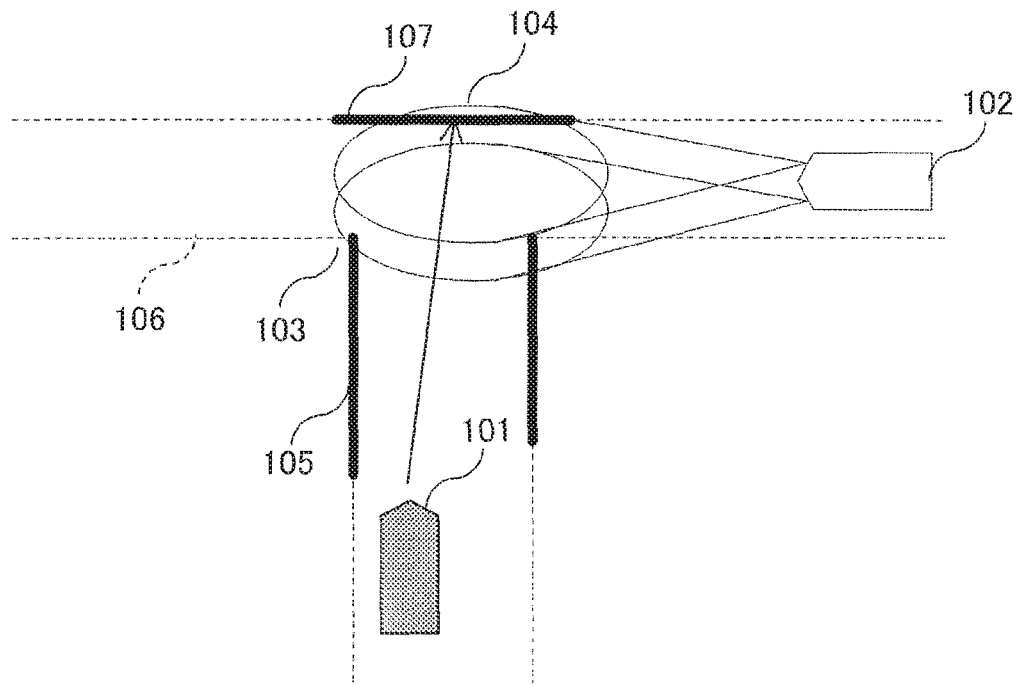
FIG. 7 is an explanatory diagram for illustrating an example of a scene involving an observed area set to a first target wall surface by a wall surface detection portion of FIG. 4.
Figure 8:
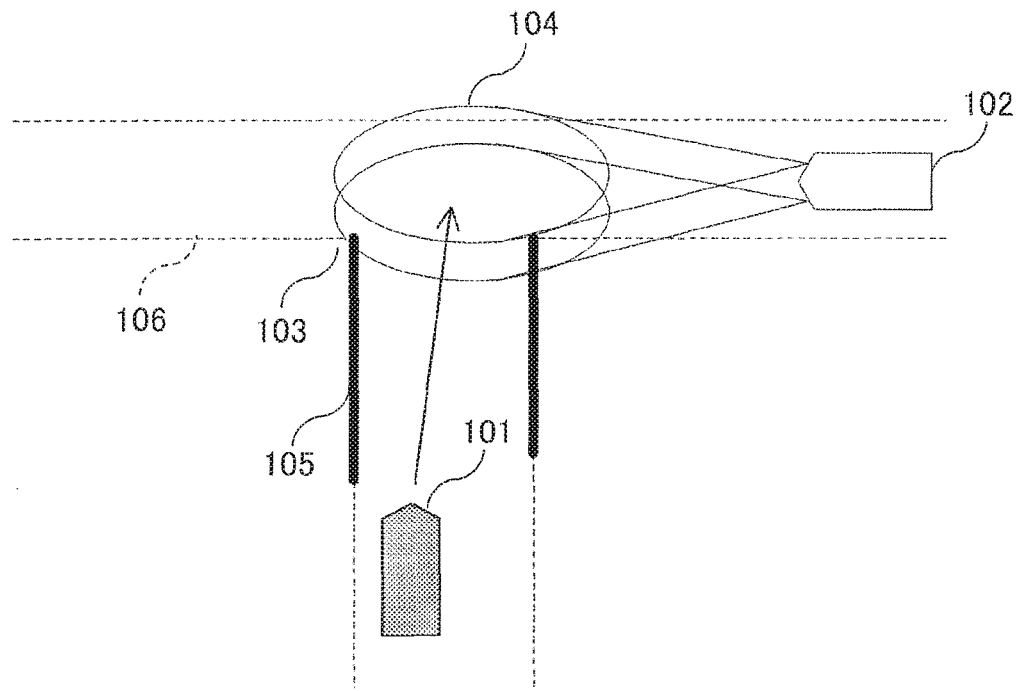
FIG. 8 is an explanatory diagram for illustrating an example of a scene involving an observed area set to a road surface by the wall surface detection portion of FIG. 4.

Now, an exemplary case where the observed area is set to the first target wall surface is described with reference to FIG. 7, and an exemplary case where the observed area is set to the road surface is described with reference to FIG. 8. FIG. 7 is an explanatory diagram for illustrating an example of a scene involving the observed area set to the first target wall surface by the wall surface detection portion 26 of FIG. 4. FIG. 8 is an explanatory diagram for illustrating an example of a scene involving the observed area set to the road surface by the wall surface detection portion 26 of FIG. 4.

In FIG. 7, bold line parts indicate wall surfaces 105 and 107 around the vehicle which are detected by the radar 6, and broken line parts indicate road edges 106 which are not detected by the radar 6. When viewed from the own vehicle 101, the wall surface 107 is located so as to be opposed to the traveling direction of the own vehicle 101, to thereby correspond to the first target wall surface, and the wall surfaces 105 are located along the traveling direction of the own vehicle 101, to thereby correspond to a second target wall surface.

In the case of the situation illustrated in FIG. 7, the wall surface detection portion 26 determines that the first target wall surface exists, and therefore sets the observed area to the first target wall surface. In this case, the camera 11 acquires the vehicle surrounding video for showing the first target wall surface as the observed area. Further, the vehicle approach detection section 21 determines the presence or absence of the change in the luminance of the first target wall surface based on the vehicle surrounding image acquired by the camera 11 in the same method as that of the first embodiment, and determines based on a determination result thereof whether or not another vehicle is approaching the vehicle.

FIG. 8 is an illustration of a situation in which the wall surface 107 does not exist compared to the situation illustrated in FIG. 7. In the case of the situation illustrated in FIG. 8, the wall surface detection portion 26 determines that the first target wall surface does not exist, and therefore sets the observed area to the road surface. In this case, the camera 11 acquires the vehicle surrounding video for showing the road surface as the observed area. Further, the vehicle approach detection section 21 determines the presence or absence of the change in the luminance of the road surface based on the vehicle surrounding image acquired by the camera 11 in the same method as that of the first embodiment, and determines based on a determination result thereof whether or not another vehicle is approaching the vehicle.

Returning to the description made with reference to FIG. 6, in Step S206 to Step S214, the vehicle approach detection device executes the same processing as the processing of Step S101 to Step S109 of FIG. 2, and the driving support is provided in Step S214. After that, the processing is brought to an end.

In this manner, the wall surface detection portion 26 determines the presence or absence of the first target wall surface based on the wall surface information generated from the radar information, and sets the observed area to any one of the first target wall surface and the road surface based on a determination result thereof. Further, the vehicle approach detection section 21 determines whether or not another vehicle is approaching the vehicle based on the time-series change in the luminance of the observed area shown in the vehicle surrounding video input from the camera 11.

As described above, according to the second embodiment, in addition to the configuration of the first embodiment, the presence or absence of the first target wall surface is determined based on the wall surface information generated from the radar information, and the observed area is set to any one of the first target wall surface and the road surface based on a determination result thereof. With this configuration, the observed area is changed based on the presence or absence of the first target wall surface around the vehicle, and hence it is possible to determine a change in the luminance of the observed area with higher accuracy. As a result, it is possible to further improve the reliability in the vehicle approach judgement.

Third Embodiment

In a third embodiment of the present invention, a description is made of a vehicle approach detection device configured to determine whether or not another vehicle is approaching the vehicle based on the presence or absence of a symbol mark projected as the irradiation light from another vehicle, in addition to the configuration of the second embodiment. Note that, in the third embodiment, the description of the same points as those of the first and second embodiments is omitted, and points different from those of the first and second embodiments are mainly described.

Figure 9:
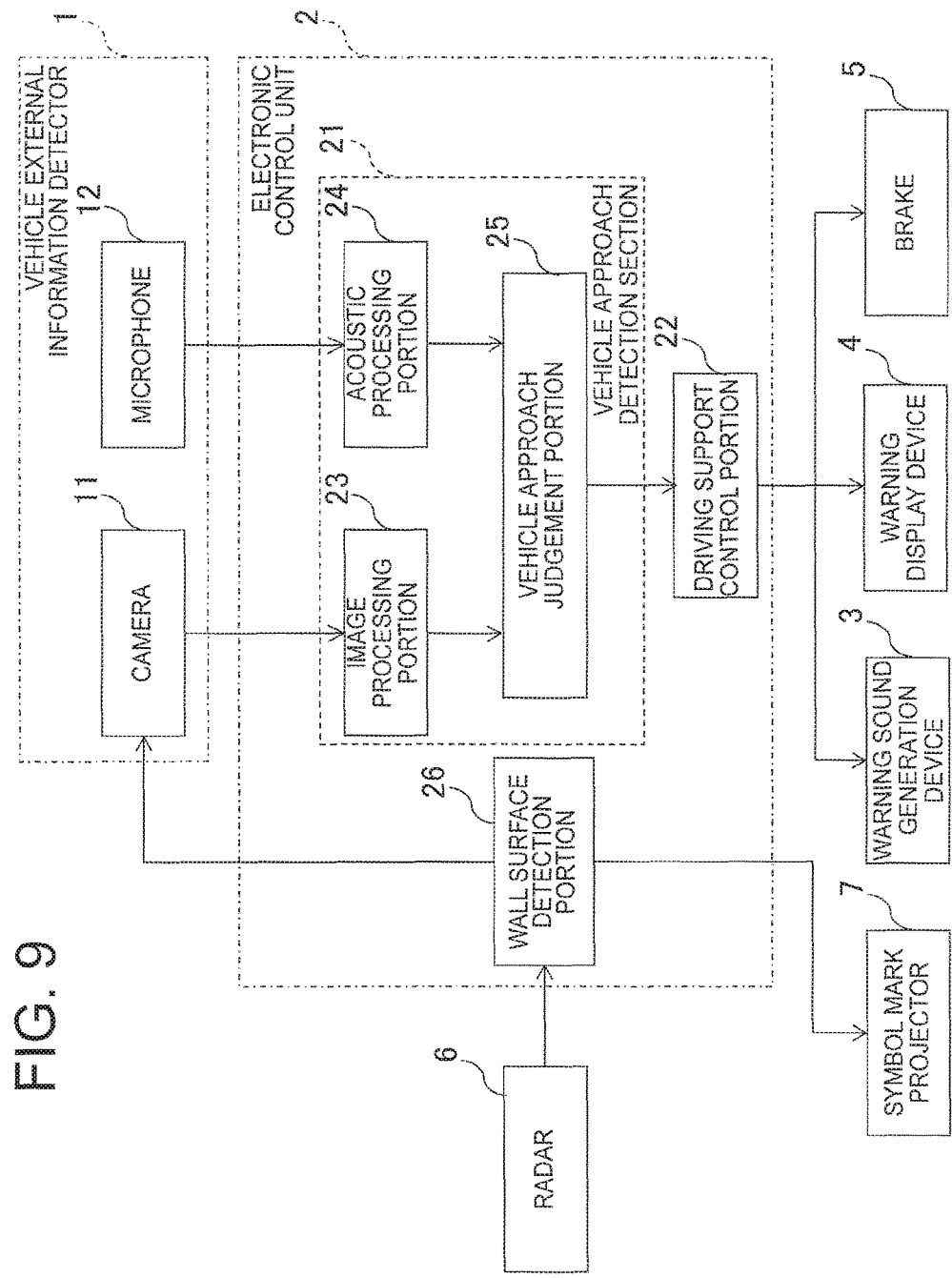
FIG. 9 is a block diagram for illustrating a configuration of a vehicle approach detection device according to a third embodiment of the present invention.

FIG. 9 is a block diagram for illustrating a configuration of the vehicle approach detection device according to the third embodiment of the present invention. In addition to the components of FIG. 4, the vehicle approach detection device of FIG. 9 further includes a symbol mark projector 7 mounted on the vehicle.

The vehicle approach detection device according to the third embodiment is further configured to conduct a symbol mark projection in addition to the vehicle approach judgement operation described in the second embodiment.

The wall surface detection portion 26 is configured to determine the presence or absence of the second target wall surface located along the traveling direction of the vehicle based on the generated wall surface information, and based on a determination result thereof, set an illuminated area of a symbol mark projector 7 to any one of the second target wall surface and the road surface.

The symbol mark projector 7 is configured to project a specific symbol mark onto the illuminated area set by the wall surface detection portion 26, to thereby display the symbol mark in the illuminated area. For example, the symbol mark projector 7 is configured to be able to project the symbol mark onto the illuminated area by emitting light in such a pattern as to form the symbol mark.

Figure 10:
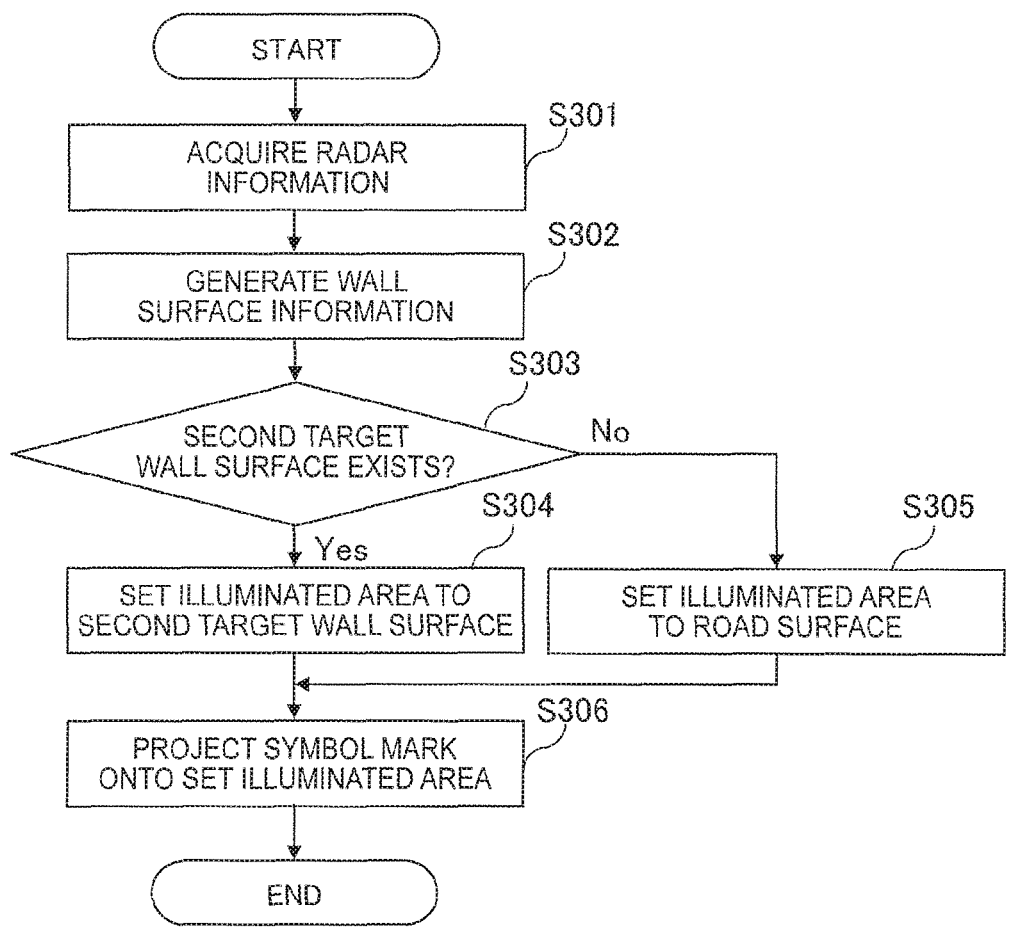
FIG. 10 is a flowchart for illustrating a series of steps of a symbol mark projection of the vehicle approach detection device according to the third embodiment of the present invention.

Next, a series of steps of a symbol mark projection of the vehicle approach detection device according to the third embodiment is described with reference to FIG. 10. FIG. 10 is a flowchart for illustrating the series of steps of the symbol mark projection of the vehicle approach detection device according to the third embodiment of the present invention.

In Step S301 and Step S302, the vehicle approach detection device executes the same processing as the processing of Step S201 and Step S202 of FIG. 5, and the processing advances to Step S303.

In Step S303, the wall surface detection portion 26 determines whether or not the second target wall surface exists based on the wall surface information generated in Step S302. In Step S303, when it is determined that the second target wall surface exists, the processing advances to Step S304, and when it is determined that the second target wall surface does not exist, the processing advances to Step S305.

In Step S304, the wall surface detection portion 26 sets the illuminated area to the second target wall surface, and the processing advances to Step S306.

In Step S305, the wall surface detection portion 26 sets the illuminated area to the road surface, and the processing advances to Step S306.

In Step S306, the symbol mark projector 7 projects the symbol mark onto the illuminated area set by the wall surface detection portion 26, and the processing is brought to an end.

Figure 11:
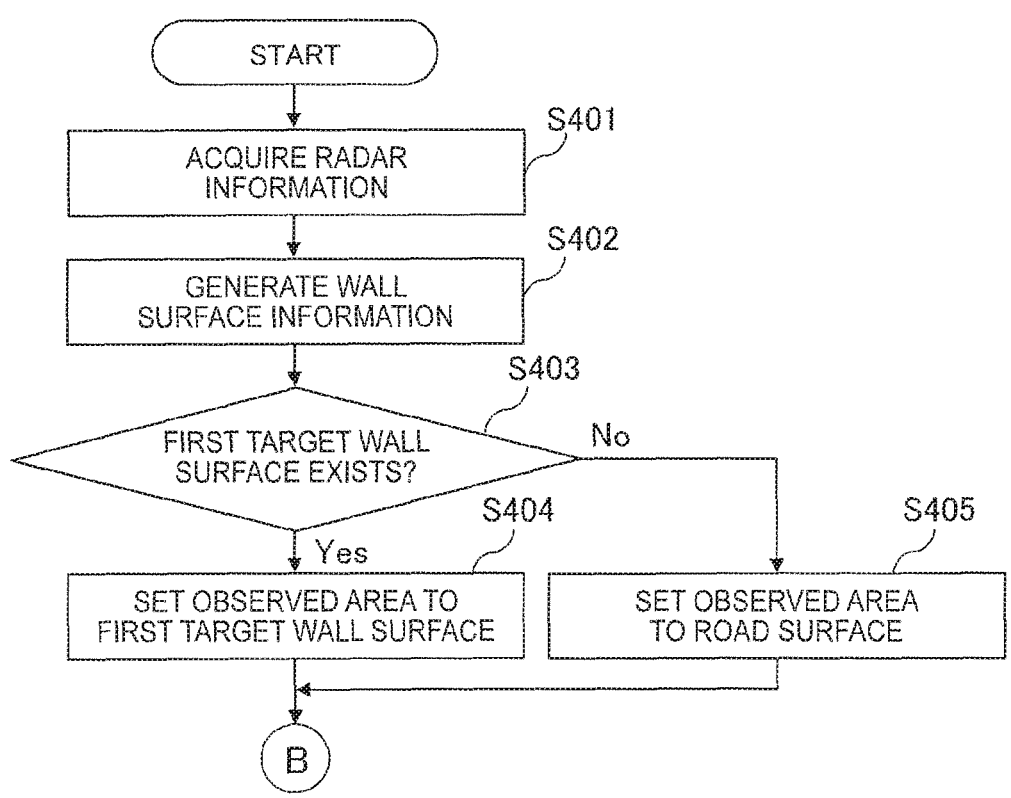
FIG. 11 is a flowchart for illustrating a series of steps of a vehicle approach judgement operation of the vehicle approach detection device according to the third embodiment of the present invention.
Figure 12:
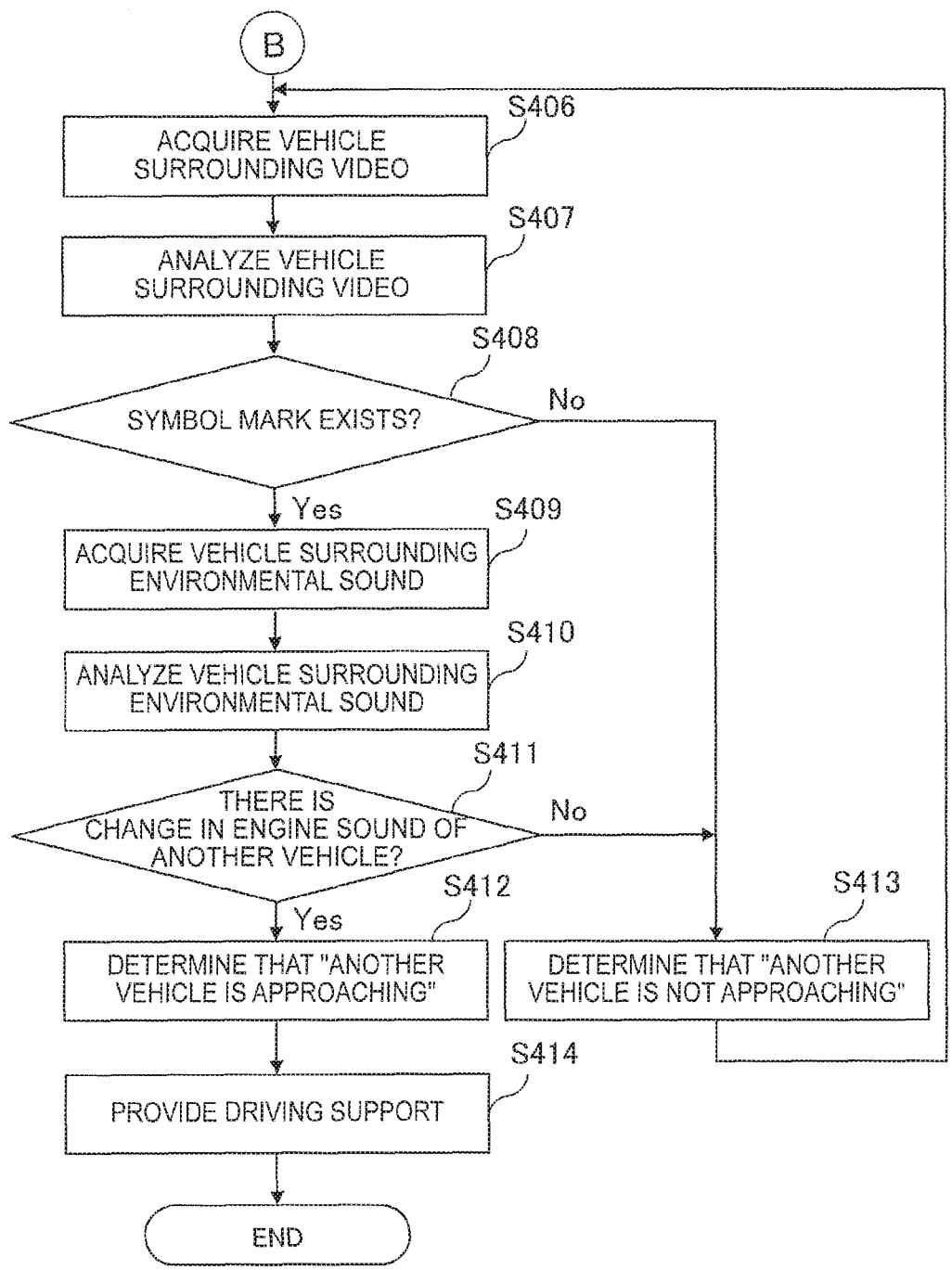
FIG. 12 is a flowchart for illustrating a series of steps of the vehicle approach judgement operation of the vehicle approach detection device according to the third embodiment of the present invention.

Next, a series of steps of a vehicle approach judgement operation of the vehicle approach detection device according to the third embodiment is described with reference to FIG. 11 and FIG. 12. FIG. 11 and FIG. 12 are a flowchart for illustrating the series of steps of the vehicle approach judgement operation of the vehicle approach detection device according to the third embodiment of the present invention. FIG. 11 and FIG. 12 are obtained by dividing one flowchart into two illustrations, and the part illustrated in FIG. 11 is followed by the part illustrated in FIG. 12.

In Step S401 to Step S406, the vehicle approach detection device executes the same processing as the processing of Step S201 to Step S206 of FIG. 5, and the processing advances to Step S407.

In Step S407, the image processing portion 23 conducts analysis for the vehicle surrounding video acquired in Step S406, and the processing advances to Step S408.

In Step S408, the vehicle approach judgement portion 25 uses the image analysis result obtained in Step S407 to determine whether or not a symbol mark projected from another vehicle exists. In Step S408, when it is determined that the symbol mark exists, the processing advances to Step S409, and when it is determined that the symbol mark does not exist, the processing advances to Step S413.

Specifically, the image processing portion 23 conducts image recognition processing, to thereby detect the symbol mark from the vehicle surrounding video input from the camera 11. The vehicle approach judgement portion 25 determines the presence or absence of the symbol mark projected from another vehicle based on the presence or absence of the symbol mark detected by the image processing portion 23.

Figure 13:
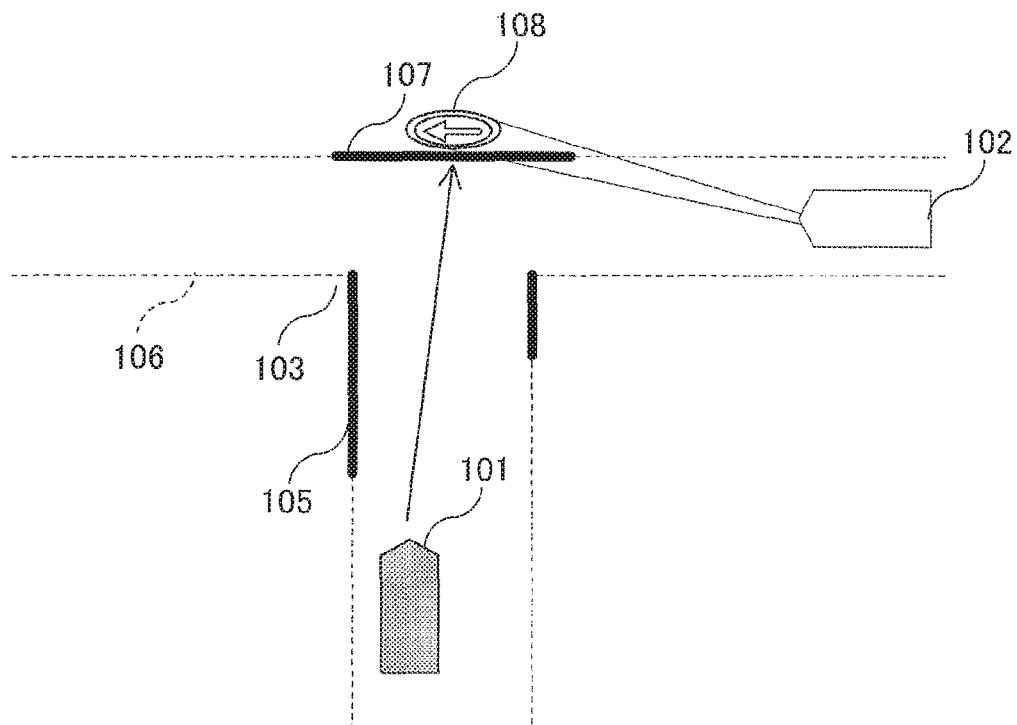
FIG. 13 is an explanatory diagram for illustrating an example of a scene involving an observed area set to a first target wall surface by a wall surface detection portion of FIG. 9.
Figure 14:
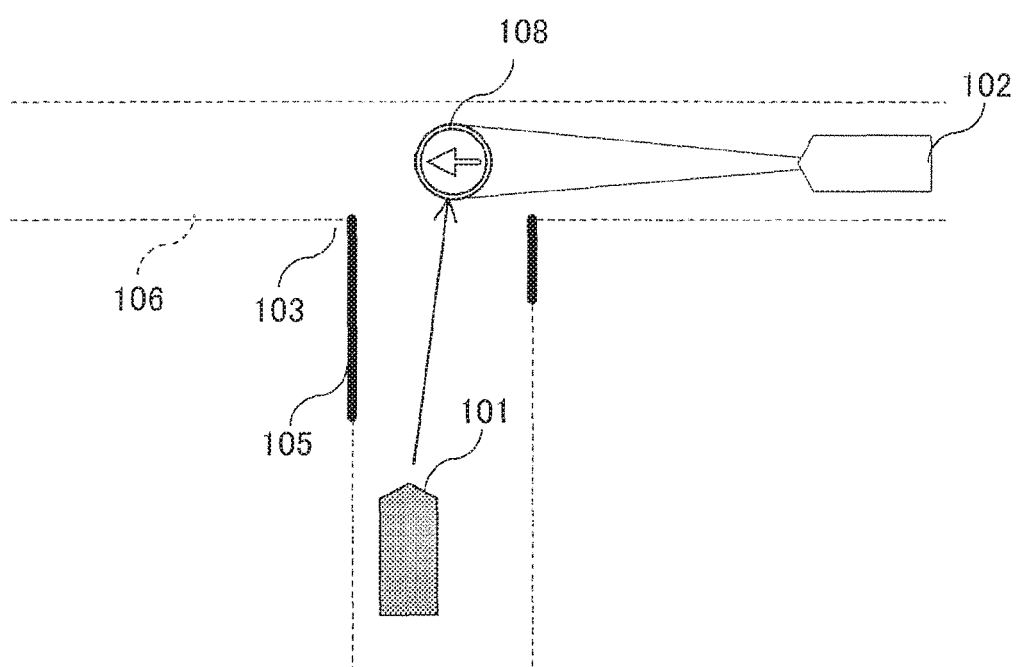
FIG. 14 is an explanatory diagram for illustrating an example of a scene involving an observed area set to a road surface by the wall surface detection portion of FIG. 9.

Now, an exemplary case where the observed area is set to the first target wall surface is described with reference to FIG. 13, and an exemplary case where the observed area is set to the road surface is described with reference to FIG. 14. FIG. 13 is an explanatory diagram for illustrating an example of a scene involving the observed area set to the first target wall surface by the wall surface detection portion 26 of FIG. 9. FIG. 14 is an explanatory diagram for illustrating an example of a scene involving the observed area set to the road surface by the wall surface detection portion 26 of FIG. 9.

It is assumed here that the vehicle approach detection device is mounted on each of the own vehicle 101 and the another vehicle 102. In order to distinguish between the respective vehicle approach detection devices of the own vehicle 101 and the another vehicle 102, "_A" is appended to the reference numerals of the components of the vehicle approach detection device mounted on the own vehicle 101, and "_B" is appended to the reference numerals of the components of the vehicle approach detection device mounted on the another vehicle 102.

In FIG. 13, when viewed from the own vehicle 101, the wall surface 107 is located so as to be opposed to the traveling direction of the own vehicle 101, to thereby correspond to the first target wall surface, and the wall surfaces 105 are located along the traveling direction of the own vehicle 101, to thereby correspond to the second target wall surface. Meanwhile, when viewed from the another vehicle 102, the wall surface 107 is located along the traveling direction of the another vehicle 102, to thereby correspond to the second target wall surface.

In the case of the situation illustrated in FIG. 13, a wall surface detection portion 26_B determines that the second target wall surface exists, and therefore sets the illuminated area to the second target wall surface. In this case, a symbol mark projector 7_B projects a symbol mark 108 onto the second target wall surface.

Further, a wall surface detection portion 26_A determines that the first target wall surface exists, and therefore sets the observed area to the first target wall surface. In this case, a camera 11_A acquires the vehicle surrounding video for showing the first target wall surface as the observed area.

On the other hand, in the case of the situation illustrated in FIG. 14, the wall surface detection portion 26_B determines that the second target wall surface does not exist, and therefore sets the illuminated area to the road surface. In this case, the symbol mark projector 7_B projects the symbol mark 108 onto the road surface.

Further, the wall surface detection portion 26_A determines that the first target wall surface does not exist, and therefore sets the observed area to the road surface. In this case, the camera 11_A acquires the vehicle surrounding video for showing the road surface as the observed area.

Returning to the description made with reference to FIG. 12, in Step S409 to Step S414, the vehicle approach detection device executes the same processing as the processing of Step S209 to Step S214 of FIG. 6, and the driving support is provided in Step S414. After that, the processing is brought to an end.

In this manner, the wall surface detection portion 26 determines the presence or absence of the first target wall surface based on the wall surface information generated from the radar information, and sets the observed area to any one of the first target wall surface and the road surface based on a determination result thereof. Further, the wall surface detection portion 26 determines the presence or absence of the second target wall surface based on the wall surface information generated from the radar information, and sets the illuminated area to any one of the second target wall surface and the road surface based on a determination result thereof. In addition, the vehicle approach detection section 21 determines the presence or absence of the symbol mark based on the vehicle surrounding video for showing the observed area, which has been input from the camera 11, and determines based on a determination result thereof whether or not another vehicle is approaching the vehicle.

As described above, according to the third embodiment, in addition to the configuration of the second embodiment, the presence or absence of the symbol mark projected as the irradiation light from another vehicle is determined based on the vehicle surrounding video input from the camera, and it is determined based on a determination result thereof whether or not another vehicle is approaching the vehicle. With this configuration, it is possible to further improve the reliability in the vehicle approach judgement than in the case of conducting the vehicle approach judgement based on the change in the luminance of the observed area.

Assuming that the illuminated area for the symbol mark projected as the irradiation light from another vehicle is constantly set to the road surface, in addition to the configuration of the first embodiment, the presence or absence of the symbol mark may be determined based on the vehicle surrounding video input from the camera, and it may be determined based on a determination result thereof whether or not another vehicle is approaching the vehicle.

Fourth Embodiment

In a fourth embodiment of the present invention, a description is made of a vehicle approach detection device configured to control a startup of the device at an appropriate timing, in addition to the configurations of the first to third embodiments. Note that, in the fourth embodiment, the description of the same points as those of the first to third embodiments is omitted, and points different from those of the first to third embodiments are mainly described. Further, the fourth embodiment is described by taking an exemplary case of being configured to control the startup of the device at an appropriate timing, in addition to the configuration of the first embodiment.

Figure 15:
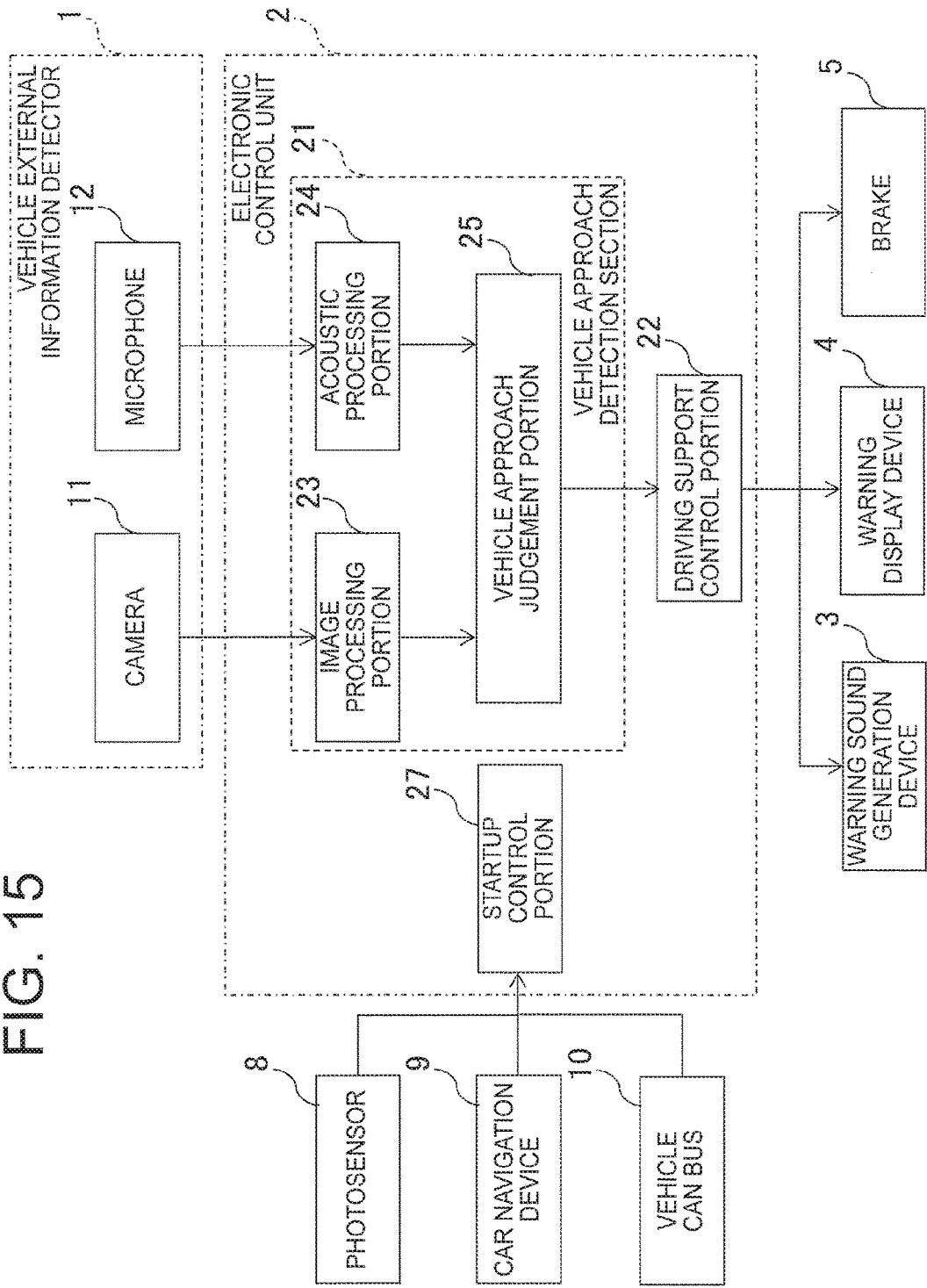
FIG. 15 is a block diagram for illustrating a configuration of a vehicle approach detection device according to a fourth embodiment of the present invention.

FIG. 15 is a block diagram for illustrating a configuration of the vehicle approach detection device according to the fourth embodiment of the present invention. In addition to the components of FIG. 1, the vehicle approach detection device of FIG. 15 further includes a photosensor 8, a car navigation device 9, and a vehicle CAN bus 10 that are mounted on the vehicle, and a startup control portion 27 included in the electronic control unit 2.

The startup control portion 27 is configured to acquire a luminance of a surrounding environment of the vehicle from the photosensor 8 configured to detect the luminance of the surrounding environment. Further, the startup control portion 27 is configured to acquire current location information on the vehicle from the car navigation device 9. In addition, the startup control portion 27 is configured to acquire a vehicle signal, specifically, light emission information indicating an emission status of a light of the vehicle, from the vehicle CAN bus 10.

In this manner, the startup control portion 27 acquires the luminance of the surrounding environment of the vehicle, the current location information on the vehicle, and the light emission information on the vehicle as startup information for controlling the startup of the device.

Figure 16:
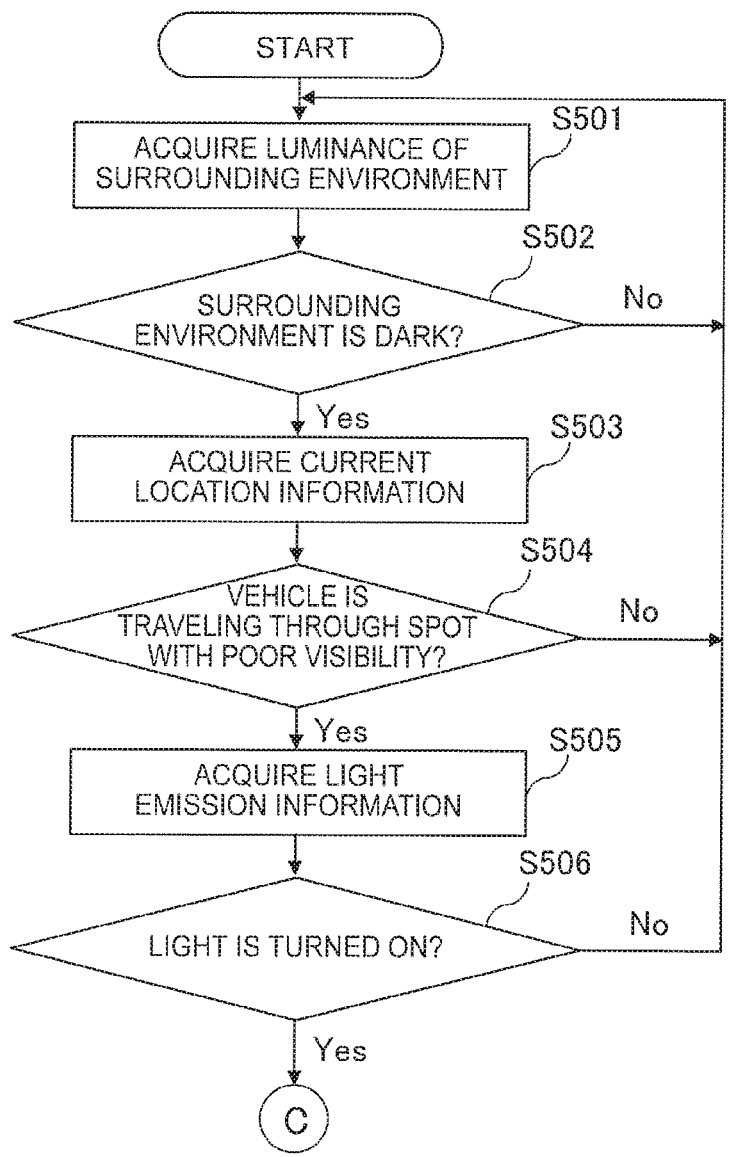
FIG. 16 is a flowchart for illustrating a series of steps of a vehicle approach judgement operation of the vehicle approach detection device according to the fourth embodiment of the present invention.
Figure 17:
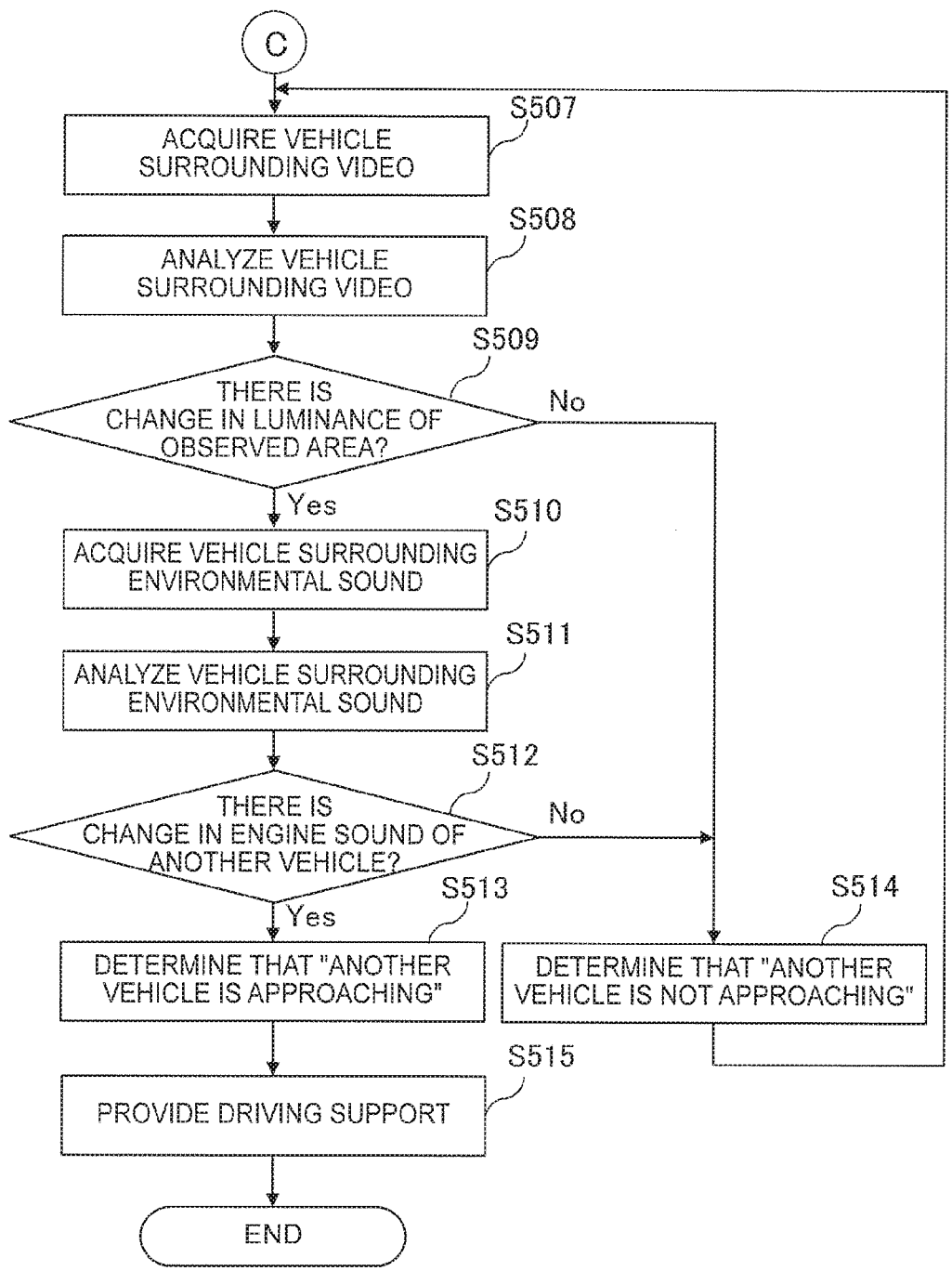
FIG. 17 is a flowchart for illustrating a series of steps of the vehicle approach judgement operation of the vehicle approach detection device according to the fourth embodiment of the present invention.

Next, a series of steps of a vehicle approach judgement operation of the vehicle approach detection device according to the fourth embodiment of the present invention is described with reference to FIG. 16 and FIG. 17. FIG. 16 and FIG. 17 are a flowchart for illustrating the series of steps of the vehicle approach judgement operation of the vehicle approach detection device according to the fourth embodiment of the present invention. FIG. 16 and FIG. 17 are obtained by dividing one flowchart into two illustrations, and the part illustrated in FIG. 16 is followed by the part illustrated in FIG. 17.

In Step S501, the startup control portion 27 acquires the luminance of the surrounding environment from the photosensor 8, and the processing advances to Step S502.

In Step S502, the startup control portion 27 determines whether or not the surrounding environment is dark based on the luminance of the surrounding environment acquired in Step S501. In Step S502, when it is determined that the surrounding environment is dark, the processing advances to Step S503, and when it is determined that the surrounding environment is not dark, the processing returns to Step S501.

Specifically, for example, the startup control portion 27 determines that the surrounding environment is dark when the acquired luminance of the surrounding environment has a value smaller than a setting value, and determines that the surrounding environment is not dark when the luminance has a value equal to or larger than the setting value. Note that, it may be determined whether or not the surrounding environment is dark based on the video acquired by the camera instead of the use of the photosensor 8.

In Step S503, the startup control portion 27 acquires the current location information from the car navigation device 9, and the processing advances to Step S504.

In Step S504, the startup control portion 27 determines whether or not the vehicle is traveling through a spot with poor visibility based on the current location information acquired in Step S503. In Step S504, when it is determined that the vehicle is traveling through a spot with poor visibility, the processing advances to Step S505, and when it is determined that the vehicle is not traveling through a spot with poor visibility, the processing returns to Step S501. Examples of the spot with poor visibility include a spot where the vehicle is about to enter an intersection with poor visibility and a spot where the vehicle is about to enter a curve.

In Step S505, the startup control portion 27 acquires the light emission information from the vehicle CAN bus 10, and the processing advances to Step S506.

In Step S506, the startup control portion 27 determines whether or not the light of the vehicle is turned on based on the light emission information acquired in Step S505. In Step S506, when it is determined that the light of the vehicle is turned on, the processing advances to Step S507, and when it is determined that the light is not turned on, the processing returns to Step S501.

In this manner, the startup control portion 27 determines whether or not to execute the processing of Step S507 and the subsequent steps, that is, whether or not to start up the device, based on the acquired startup information. In other words, the startup of the device is controlled based on the luminance of the surrounding environment, the current location information, and the light emission information, to thereby be able to operate the device only in a case assumed to be necessary.

Note that, although the case where all of the luminance of the surrounding environment of the vehicle, the current location information on the vehicle, and the light emission information on the vehicle are used to control the startup of the device is exemplified, the startup of the device may be controlled through use of at least one of those pieces of information.

In Step S507 to Step S515, the vehicle approach detection device executes the same processing as the processing of Step S101 to Step S109 of FIG. 2, and the driving support is provided in Step S515. After that, the processing is brought to an end.

As described above, according to the fourth embodiment, in addition to the configurations of the first to third embodiments, at least one of the luminance of the surrounding environment of the vehicle, the current location information on the vehicle, and the light emission information on the vehicle is acquired as the startup information, and the startup of the device is controlled based on the startup information. With this configuration, it is possible to control the startup of the device at an appropriate timing.

Note that, descriptions are given of the first to fourth embodiments individually, but the configuration examples described respectively in the first to fourth embodiments can arbitrarily be combined.

What is claimed is:

1. A vehicle approach detection device that is mounted on a first vehicle, the vehicle approach detection device comprising:
a vehicle external information detector configured to detect vehicle external information comprising a vehicle surrounding video that shows a road surface onto which light emitted from a second vehicle is incident and a vehicle surrounding environmental sound emitted from the second vehicle; and
a controller comprising a vehicle approach detector configured to determine whether the second vehicle is approaching the first vehicle based on a temporal change in a luminance of the road surface onto which the light emitted from the second vehicle is incident and the vehicle surrounding environmental sound emitted from the second vehicle.

2. A vehicle approach detection device that is mounted on a first vehicle, the vehicle approach detection device comprising:
a vehicle external information detector configured to detect vehicle external information that comprises at least one of a vehicle surrounding video that shows a target observation area that is used to observe light emitted from a second vehicle and a vehicle surrounding environmental sound;

a controller comprising a vehicle approach detector configured to determine whether the second vehicle is approaching the first vehicle based on the detected vehicle external information; and a radar configured to detect radar information comprising information about an obstruction around the first vehicle, wherein:

the controller further comprises a wall surface detector configured to generate information about a wall surface around the first vehicle as wall surface information, based on the radar information, determine whether a first target wall surface is located in a traveling direction of the first vehicle based on the wall surface information, and set the target observation area to any one of the first target wall surface and the road surface based on a results of the determination;

the vehicle external information detector comprises a camera configure to acquire the vehicle surrounding video that shows the target observation area set by the wall surface detector to output the acquired vehicle surrounding video as the vehicle external information; and the vehicle approach detector is configured to determine whether the second vehicle is approaching the first vehicle based on a temporal change in a luminance of the target observation area shown in the vehicle surrounding video input from the camera.

3. The vehicle approach detection device according to claim 1, wherein:

the vehicle external information detector comprises a camera configured to acquire the vehicle surrounding video that shows the road surface; and the vehicle approach detector is configured to determine whether a symbol mark projected as the light emitted from the second vehicle based on the vehicle surrounding video input from the camera to determine whether the second vehicle is approaching the first vehicle.

4. A vehicle approach detection device that is mounted on a first vehicle, the vehicle approach detection device comprising:

a vehicle external information detector configured to detect vehicle external information that comprises at least one of a vehicle surrounding video that shows a target observation area that is used to observe light emitted from a second vehicle and a vehicle surrounding environmental sound;

a controller comprising a vehicle approach detector configured to determine whether the second vehicle is approaching the first vehicle based on the detected vehicle external information; and a radar configured to detect radar information comprising information about an obstruction around the first vehicle; and a symbol mark projector configured to project a symbol mark onto an illuminated area, wherein:

the controller is configured to generate wall surface information comprising information about a wall surface around the first vehicle, based on the radar information input from the radar, determine, as a first determination, whether a first target wall surface is located in a traveling direction of the first vehicle based on the wall surface information, set the target observation area to any one of the first target wall surface and a road surface based on the first determination, determine, as a second determination, whether a second target wall surface is located in the traveling direction of the first vehicle based on the wall surface information, and set the illuminated area to any one of the second target wall surface and the road surface based on the second determination;

the vehicle external information detector comprises a camera configured to acquire the vehicle surrounding video that shows the target observation area set by the wall surface detector to output the acquired vehicle surrounding video as the vehicle external information;

the symbol mark projector is configured to project the symbol mark onto the illuminated area set by the wall surface detector; and the vehicle approach detector is configured to determine, as a third determination, whether the symbol mark is projected as the light emitted from the second vehicle based on the vehicle surrounding video input from the camera, and determine whether the second vehicle is approaching the first vehicle based on the third determination.

5. The vehicle approach detection device according to claim 1, wherein:

the vehicle external information detector comprises a microphone configured to acquire the vehicle surrounding environmental sound; and the vehicle approach detector is configured to determine whether the second vehicle is approaching the first vehicle based on a temporal change in an engine sound of the second vehicle included in the vehicle surrounding environmental sound input from the microphone.

6. The vehicle approach detection device according to claim 1, wherein the controller further comprises a startup controller configured to acquire startup information comprising at least one of a luminance of a surrounding environment of the first vehicle, current location of the first vehicle, and light emission of the first vehicle, and control a startup of the vehicle approach detection device based on the acquired startup information.

7. The vehicle approach detection device according to claim 1, wherein the controller further comprises a driving support controller configured to provide the first vehicle with driving support when the vehicle approach detector determines that the second vehicle is approaching the first vehicle.

8. The vehicle approach detection device according to claim 7, wherein the driving support controller is configured to warn a driver of the first vehicle that the second vehicle is approaching the first vehicle as the driving support.

9. The vehicle approach detection device according to claim 7, wherein the driving support controller is configured to reduce a speed of the first vehicle as the driving support.

10. A vehicle approach detection method to be executed by an controller mounted on a first vehicle, the vehicle approach detection method comprising:

acquiring vehicle external information from a vehicle external information detector configured to detect vehicle external information comprising a vehicle surrounding video that shows a road surface onto which light emitted from a second vehicle is incident and a vehicle surrounding environmental sound emitted from the second vehicle; and determining whether the second vehicle is approaching the first vehicle based on a temporal change in a luminance of the road surface onto which the light emitted from the second vehicle is incident and the vehicle surrounding environmental sound emitted from the second vehicle.

* * * * *